United States Patent
Keller et al.

(10) Patent No.: US 8,016,085 B2
(45) Date of Patent: Sep. 13, 2011

(54) DISK BRAKE, IN PARTICULAR FOR COMMERCIAL VEHICLES, AND HOLD-DOWN SPRING OF SUCH A DISK BRAKE

(75) Inventors: Marcus Keller, Weilheim (DE); Andreas Steinmetz, Gleishorbach (DE)

(73) Assignee: WABCO Radbremsen GmbH (DE)

( * ) Notice: Subject to any disclaimer, the term of this patent is extended or adjusted under 35 U.S.C. 154(b) by 0 days.

(21) Appl. No.: 12/669,777

(22) PCT Filed: Jul. 31, 2008

(86) PCT No.: PCT/EP2008/006327
§ 371 (c)(1),
(2), (4) Date: Jun. 8, 2010

(87) PCT Pub. No.: WO2009/015893
PCT Pub. Date: Feb. 5, 2009

(65) Prior Publication Data
US 2010/0276232 A1 Nov. 4, 2010

(30) Foreign Application Priority Data
Aug. 2, 2007 (DE) .......................... 10 2007 036 353

(51) Int. Cl.
*F16D 65/40* (2006.01)
(52) U.S. Cl. .................................. 188/73.38; 188/73.37
(58) Field of Classification Search ..... 188/73.36–73.38
See application file for complete search history.

(56) References Cited

U.S. PATENT DOCUMENTS

| 4,441,588 A | 4/1984 | Saito |
| 4,940,120 A | 7/1990 | Schmidt et al. |
| 5,064,028 A | 11/1991 | Antony et al. |
| 5,875,873 A * | 3/1999 | Kay et al. ................. 188/73.38 |

FOREIGN PATENT DOCUMENTS

| DE | 1575952 A | 2/1970 |
| DE | 44 26 603 A1 | 2/1996 |
| EP | 1780437 A2 | 9/2006 |

OTHER PUBLICATIONS

Antony, P.; Blatt, P. "Bremssattel mit tangential versetzen Bremsbelagen", in: VDI-Berichte Nr 1876, Jun. 2005, 7 pages.

* cited by examiner

*Primary Examiner* — Christopher Schwartz
(74) *Attorney, Agent, or Firm* — Schwabe, Williamson & Wyatt, P.C.

(57) ABSTRACT

The invention relates to a disk brake, particularly for commercial vehicles, comprising a hold-down spring (2) for holding down a force transmission device of the disk brake, wherein the hold-down spring comprises a first holding region (4) having a first support device for support on a hold-down device in the one circumferential direction of the brake disk of the disk brake and having a second support device for support on the hold-down device in the other circumferential direction of the brake disk. The hold-down spring comprises a second holding region (5) having a third support device for support on a hold-down device in the one circumferential direction of the brake disk and having a fourth support device for support on the hold-down device in the other circumferential direction of the brake disk. The first holding region is located symmetrically to the second holding region in regards to an axis of symmetry of the hold-down spring that is provided transversally to the longitudinal extension of the hold-down spring.

12 Claims, 2 Drawing Sheets

DISK BRAKE, IN PARTICULAR FOR COMMERCIAL VEHICLES, AND HOLD-DOWN SPRING OF SUCH A DISK BRAKE

CROSS REFERENCE TO RELATED APPLICATIONS

The present application is a national phase entry of, and claims priority under 35 U.S.C. §120 to International Patent Application No. PCT/EP2008/006327, filed 31 Jul. 2008, entitled "SCHEIBENBREMSE, INSBESONDERE FUR NUTZFAHRZEUGE, SOWIE NIEDERHALTEFEDER EINER SOLCHEN SCHEIBENBREMSE," which designates the United States of America and which claims priority to German Patent Application No. 102007036353.4, filed 2 Aug. 2007, entitled "SCHEIBENBREMSE, INSBESONDERE FUR NUTZFAHRZEUGE, SOWIE NIEDERHALTEFEDER EINER SOLCHEN SCHEIBENBREMSE," the entire content and disclosure of which is hereby incorporated by reference in its entirety.

TECHNICAL FIELD OF THE INVENTION

The invention relates to a disk brake, in particular for commercial vehicles, having a hold-down spring for holding down a force transmission direction [sic, device][1] of the disk brake, wherein the hold-down spring has a first holding area with a first supporting device for support on a hold-down device in one circumferential direction of the brake disk of the disk brake and with a second supporting device for support on the hold-down device in the other circumferential direction of the disk brake.

BACKGROUND OF THE INVENTION

A disk brake of the type defined in the introduction is known from DE 44 26 603 A1, for example, where the spring sits on a brake lining support of a brake lining, which has a friction lining and serves as a force transmission element, acted upon by a hold-down element in the form of an abutment attached to the brake caliper and serving as the hold-down device, so that the brake lining is under spring prestress. The hold-down spring according to DE 44 26 603 A1 is designed to be symmetrical with its central axis. The spring legs are of equal length and a holding area with supporting devices in the form of radial protrusions is formed in the central area of the spring. These supporting devices secure the hold-down spring in the circumferential direction of the brake disk, as it is in contact with the hold-down element, which is secured in a stationary position.

The hold-down spring, the hold-down element and the brake lining are arranged symmetrically with one another in the disk brake according to DE 44 26 603 A1.

However, disk brakes often require installation positions in which the stationary hold-down element and the brake lining, for example, are not symmetrical with one another but instead are offset relative to one another in the circumferential direction of the brake disk to such an extent that there is no longer suitable contact. The mechanical situation is unfavorable if the offset is this great.

SUMMARY OF THE INVENTION

The object of the present invention is to improve upon the disk brake according to DE 44 26 603 A1, such that mechanically favorable conditions can be achieved, even with a large offset.

According to the invention, the object that is formulated is achieved by the fact that the hold-down spring has a second hold-down area with a third supporting device for support on a hold-down device in the one circumferential direction of the brake disk and with a fourth supporting device for support on the hold-down device in the other circumferential direction of the brake disk, and the first holding area is symmetrical with the second holding area with respect to an axis of symmetry of the hold-down spring running across the longitudinal extent of the hold-down spring.

In other words, the hold-down spring is designed asymmetrically with regard to the holding areas. Therefore, even when the components (e.g., hold-down element, brake lining support, pressure plate) of the disk brake are severely offset relative to one another, mechanically satisfactory conditions can be achieved.

On the other hand, however, while retaining the asymmetry described above with regard to the hold-down areas, a global symmetry is created, namely by comparing a second holding area, which is opposite the first holding area on the other side of the axis of symmetry.

Because of its global symmetry, this embodiment of the hold-down spring allows a proper installation in two installed positions rotated by 180° relative to one another in the disk brake, thus preventing an incorrect installation, which might result in a malfunction.

According to the invention, the first and/or second holding area preferably has a stop on which a hold-down device is supported in the circumferential direction of a brake disk.

This stop serves to hold the hold-down spring in the circumferential direction of the brake disk (in each operating position of the brake, if desired), so that it may serve to provide, for example, (elastic) support for the force transmission element in the circumferential direction of the brake disk.

An especially simple design is obtained when the stop is formed on an inverted part. The inverted part extends preferably radially outward according to the invention to prevent contact/impact against the force transmission device.

The hold-down device preferably has a hold-down element according to the invention.

More preferably, it is supported in two locations on the hold-down spring.

According to an especially preferred embodiment of the invention, the hold-down spring has at least one recess through which a lug extends to the force transmission element.

There is therefore the possibility of connecting the hold-down spring to the force transmission device in the axial direction of the brake disk.

The recess is preferably situated between a holding area and a free end of the hold-down spring.

This rules out the possibility that the recess will weaken the holding area.

Even more preferred according to the invention, the hold-down spring has two recesses which are symmetrical with the axis of symmetry and through which one lug each on the force transmission device extends.

In other words, not only the holding areas but also the recesses are included in the global symmetry.

The force transmission device may be a brake lining support and/or a pressure plate.

Even more preferably according to the invention, it is provided that the hold-down device is not situated symmetrically with the force transmission device and either just the first supporting device or just the second supporting device is supported on the hold-down device.

In other words, the hold-down spring, which is designed to be essentially symmetrical, is used and/or stressed asymmetrically. In particular, one result of the asymmetrically situated hold-down device is that the two spring legs of the hold-down spring are of different lengths. On the side of the hold-down spring, on which the supporting device is supported on the hold-down device there, this results in a short spring leg on one side and a long spring leg on the other side, namely on the passive supporting device. However, this asymmetry does not stand in the way of installation of the hold-down spring, which is rotated by 180° because the hold-down spring again forms the aforementioned short spring leg on the one hand (active side) and the long spring leg on the other hand (passive side) when installed in a 180° rotated position. If the hold-down spring had an asymmetrical design, then support on the hold-down device in the circumferential direction would no longer be guaranteed with installation in a 180° rotated position.

In addition to the disk brake described above, the present invention also relates to a hold-down spring for such a disk brake designed according to the preceding discussion.

BRIEF DESCRIPTION OF THE DRAWINGS

The invention is explained in greater detail below on the basis of a preferred exemplary embodiment with reference to the accompanying drawings with additional details, in which.

DETAILED DESCRIPTION

Figure 1:
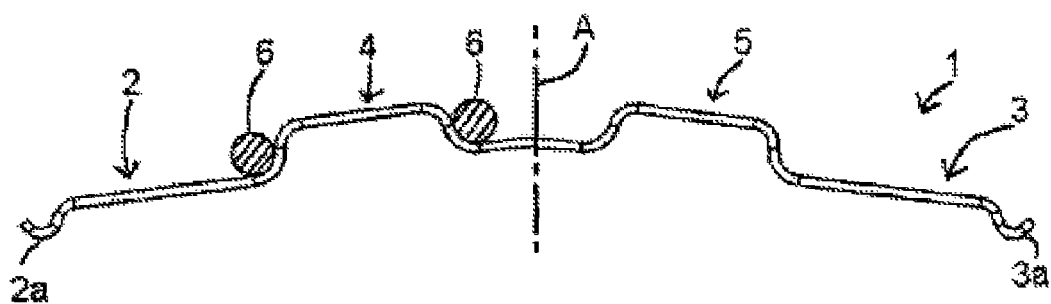
FIG. 1 shows a schematic side view of a hold-down spring of a disk brake according to a preferred exemplary embodiment of the invention, having a hold-down device embodied as a hold-down element.
Figure 2:
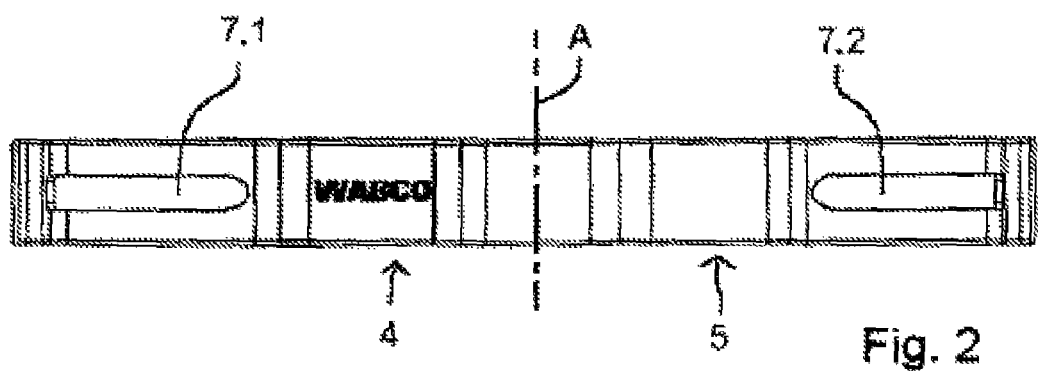
FIG. 2 shows a schematic view from above of the hold-down spring according to FIG. 1.
Figure 3:
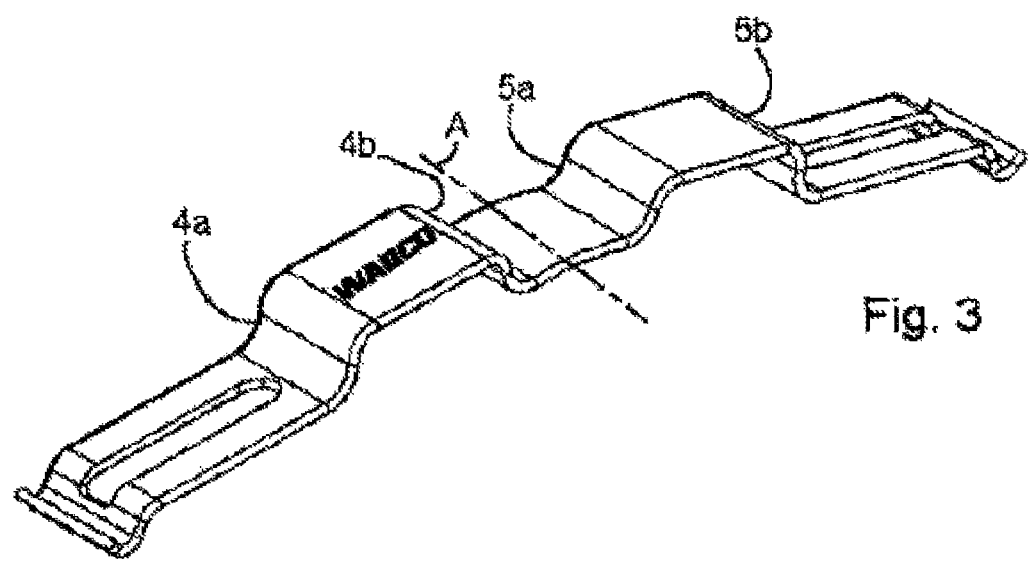
FIG. 3 shows a schematic perspective view of the hold-down spring according to FIG. 1.

The drawing shows a hold-down spring 1 designed in the form of a plate spring with two spring legs 2 and 3. Two holding areas 4, 5 are designed to be symmetrical with an axis of symmetry A. The holding areas 4, 5 have the same contour. They comprise essentially an inverted portion directed radially outward with respect to the brake disk (not shown) with the preferred direction of rotation D. In other words, the hold-down spring 1 is curved into an approximate U shape in the holding areas 4, 5. Stops 4a, 4b, 5a, 5b are formed on the legs of the U. FIG. 1 shows that a hold-down element, which serves as the hold-down device 6, comes to a stop against the stops 4a and 4b to secure the hold-down spring 1 in the stationary position in the circumferential direction of the brake disk. The hold-down element 6 is also in contact with the hold-down spring in the radial direction of the brake disk, to hold it down in the radial direction.

Figure 6:
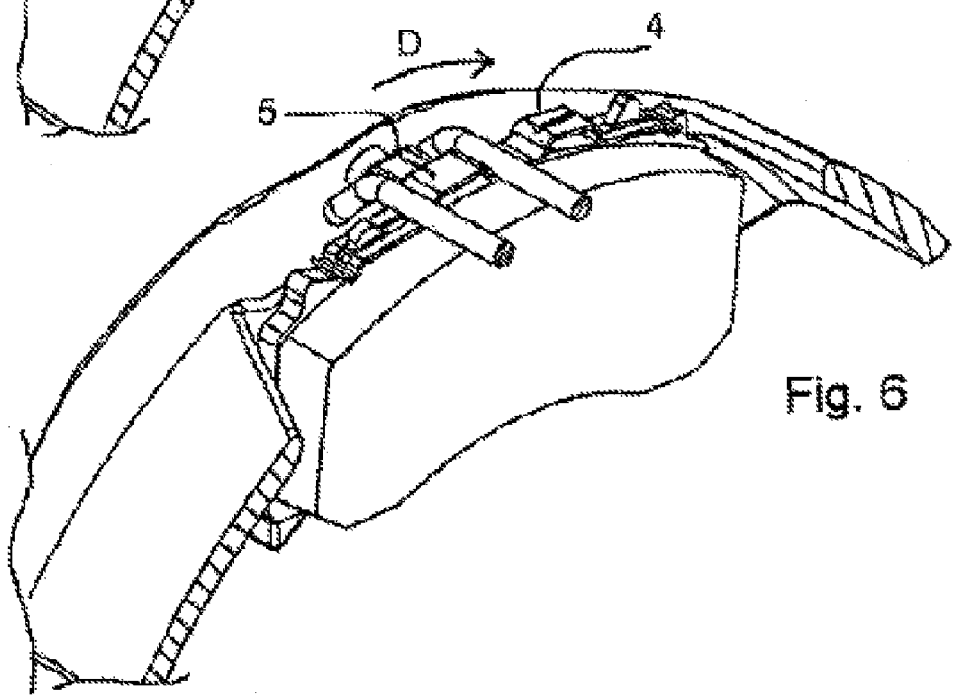
FIG. 6 shows the same view as in FIG. 5 but with the hold-down spring installed in a position that has been rotated 180°.

The diagram in FIG. 6 differs from that in FIG. 1 in that the hold-down element 6 is not in contact with the stops 4a 4b, for example, but instead is in contact with the stops 5a 5b to hold the hold-down spring 1 in a stationary position with respect to the circumferential direction of the brake disk.

The hold-down spring 1 has recesses 7.1 and 7.2, which are symmetrical with the axis of symmetry A and by means of which lugs 8.1 and 8.2 of a brake lining support 10 with a friction coating through which the lugs protrude in the installed state and serves as the force transmission device. The hold-down spring 1 is therefore coupled to the brake disk support 10 in the axial direction of the brake disk.

Figure 4:
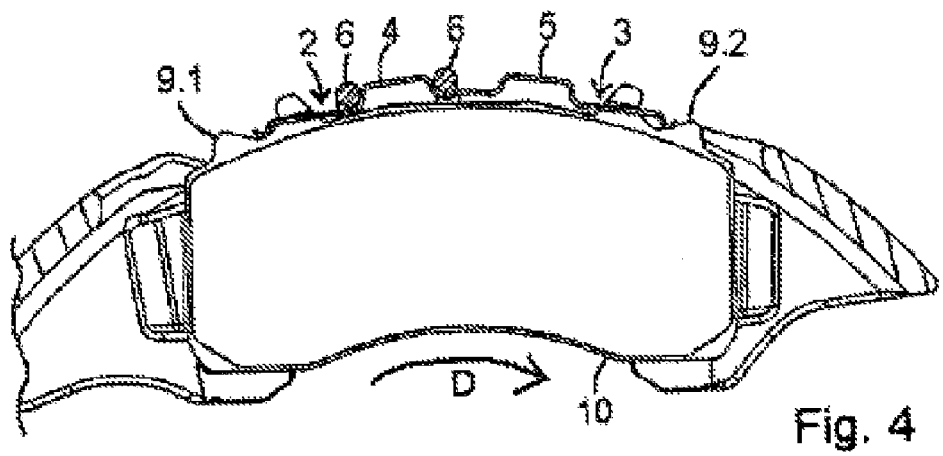
FIG. 4 shows a schematic partial sectional view of an exemplary embodiment of the inventive disk brake with the hold-down spring according to FIGS. 1 to 3.

The ends 2a and 3a of the plate spring 1 and/or of the spring legs 2 and 3 are designed with a curvature. They are therefore able to be elastically supported on the lugs 9.1 9.2 of the brake lining support 10, depending on the installed position and the operating state of the brake. Thus, for example, according to FIG. 4 with a given direction of rotation D of the brake disk, the end 3a of the spring leg 3 is in elastic contact with the lug 9.2 of the brake lining support 10. Therefore, a prestress of the brake lining 10 in the circumferential direction and/or tangential direction of the brake disk is achieved. In this direction, the brake lining support 10 can rotate because of the elongated design of the recesses 7.1, 7.2 with respect to the stationary hold-down spring 1. Depending on the offset and their position relative to one another, there may thus be radial prestress alone as well as together with a tangential prestress.

Figure 5:
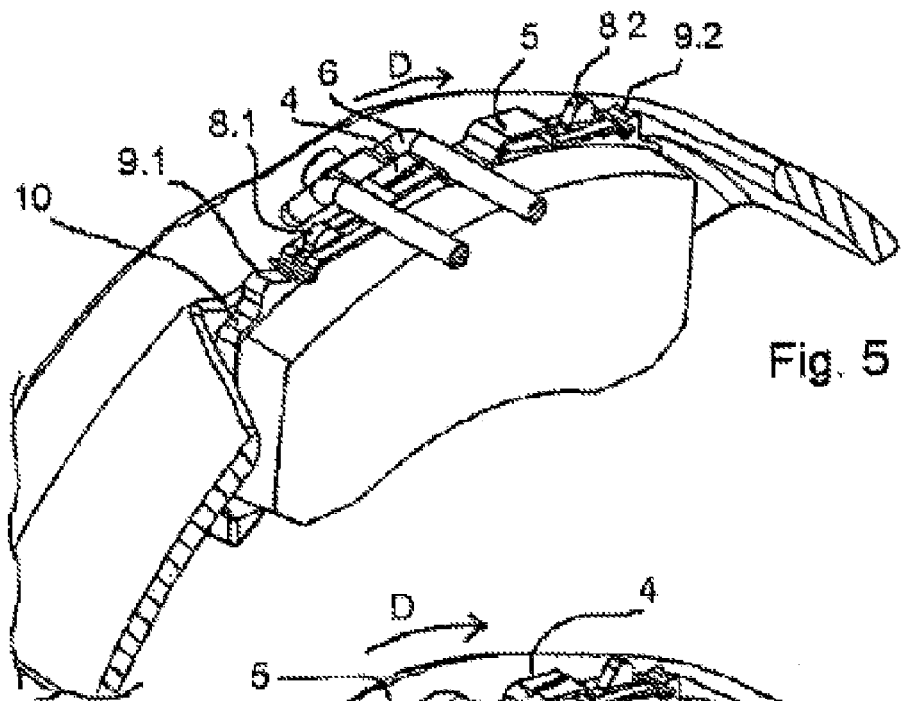
FIG. 5 shows a perspective view of the disk brake according to FIG. 4.

In particular, a view of FIGS. 5 and 6 together shows that, regardless of the installed position of the hold-down spring 1, the effective length of the spring leg situated on the disk inlet side is smaller than that on the disk outlet side. In other words, due to the eccentric arrangement of the two holding areas 4, 5 in combination with the global symmetry, i.e., the fact that the two holding areas 4, 5 are symmetrical with the axis of symmetry A, the mechanical advantage of spring legs of different lengths is achieved without any risk of improper installation.

Although this is not shown in the drawings, the hold-down spring 1 may still have an additional holding area which is situated centrally in order to be able to use it in brakes in which the hold-down device (hold-down element 6) is not offset in the circumferential direction of the brake disk with respect to the force transmission device (brake lining support or pressure plate). The central arrangement of such an additional holding area again prevents faulty installation.

The features of the invention disclosed in the above description, the claims and the drawing may be essential to the implementation of the invention in its various embodiments either individually or in any combinations.

The invention claimed is:

1. A disk brake, comprising:
a hold-down spring for holding down a force transmission device of the disk brake, wherein
the hold-down spring has a first holding area with a first supporting device for support on a hold-down device in one circumferential direction of the brake disk of the disk brake and with a second supporting device for support on the hold-down device in another circumferential direction of the brake disk,
characterized in that
the hold-down spring has a second holding area with a third supporting device for support on a hold-down device in the one circumferential direction of the brake disk of the disk brake and with a fourth supporting device for support on the hold-down device in the other circumferential direction of the brake disk,
the first holding area is situated symmetrically with the second holding area with respect to an axis of symmetry of the hold-down spring situated across the longitudinal extent of the hold-down spring,
the hold-down device is not situated symmetrically with the force transmission device and either only the first or only the second supporting device is supported on the hold-down device.

2. The disk brake according to claim 1, characterized in that the first and/or second holding area(s) has a stop on which a hold-down device is supported in the circumferential direction of a brake disk.

3. The disk brake according to claim 2, characterized in that the stop is formed on an inverted part.

4. The disk brake according to claim 3, characterized in that the inverted part extends radially outward.

5. The disk brake according to claim 1, characterized in that the hold-down device has a hold-down element.

6. The disk brake according to claim 1, characterized in that the hold-down device is supported on the hold-down spring in two locations.

7. The disk brake according to claim 1, characterized in that the hold-down spring has at least one recess through which a lug on the force transmission device extends.

8. The disk brake according to claim 7, characterized in that the recess is situated between a holding area and a free end of the hold-down spring.

9. The disk brake according to claim 1, characterized in that the hold-down spring has two recesses situated symmetrically with the axis of symmetry through which one lug each on the force transmission device extends.

10. The disk brake according to claim 1, characterized in that the force transmission device is a brake lining support and/or a pressure plate.

11. The disk brake according to claim 1, characterized in that the hold-down device is not symmetrical with the force transmission device and either only the first supporting device or only the second supporting device is supported on the hold-down device.

12. The hold-down spring for a disk brake according to any one of the preceding claims.

* * * * *